(12) United States Patent
Ladi (10) Patent No.: US 11,535,489 B2
(45) Date of Patent: Dec. 27, 2022

(54) ELEVATOR CALLS FROM A WEARABLE BASED ON HEALTH PROFILE

(71) Applicant: Otis Elevator Company, Farmington, CT (US)

(72) Inventor: Srinivasa Rao Ladi, Telangana (IN)

(73) Assignee: OTIS ELEVATOR COMPANY, Farmington, CT (US)

(*) Notice: Subject to any disclaimer, the term of this patent is extended or adjusted under 35 U.S.C. 154(b) by 812 days.

(21) Appl. No.: 16/534,595

(22) Filed: Aug. 7, 2019

(65) Prior Publication Data

US 2020/0048036 A1 Feb. 13, 2020

(30) Foreign Application Priority Data

Aug. 10, 2018 (IN) .............................. 201811030188

(51) Int. Cl.
 *B66B 1/28* (2006.01)
 *B66B 1/46* (2006.01)
 *H04W 4/021* (2018.01)

(52) U.S. Cl.
 CPC ............. *B66B 1/468* (2013.01); *H04W 4/021* (2013.01); *B66B 2201/4638* (2013.01); *B66B 2201/4653* (2013.01); *B66B 2201/4669* (2013.01)

(58) Field of Classification Search
 CPC ............ B66B 1/468; B66B 2201/4638; B66B 2201/4653; B66B 2201/4669; B66B 1/2408; B66B 5/0012; B66B 2201/232; B66B 1/14; B66B 1/46; B66B 2201/10; H04W 4/021
 USPC ........................................................ 187/247
 See application file for complete search history.

(56) References Cited

U.S. PATENT DOCUMENTS

| 5,407,028 | A | * | 4/1995 | Jamieson | .................. | B66B 5/10 |
| | | | | | | 187/394 |
| 6,223,160 | B1 | * | 4/2001 | Kostka | .................... | B66B 1/468 |
| | | | | | | 704/275 |
| 6,828,918 | B2 | * | 12/2004 | Bowman | ................. | G06F 1/163 |
| | | | | | | 340/925 |
| 7,787,992 | B2 | | 8/2010 | Pretlove et al. | | |
| 9,323,232 | B2 | * | 4/2016 | Blom | ..................... | G06Q 10/04 |

(Continued)

FOREIGN PATENT DOCUMENTS

| CN | 101983169 | A | * | 3/2011 | ........... B66B 1/2458 |
| CN | 101983169 | A | | 3/2011 | |

(Continued)

OTHER PUBLICATIONS

Chinese Office Action for Application No. 201910729138.8; dated Jul. 2, 2021; 10 Pages.

(Continued)

*Primary Examiner* — Mahendra R Patel
(74) *Attorney, Agent, or Firm* — Cantor Colburn LLP (57) ABSTRACT

A method of health profile based elevator calls is provided. The method is implemented by a system comprising an elevator. The system is in communication with a mobile device of a user. The system determines a distance between a lobby respective to the at least one elevator and the mobile device and acquires a health profile of the user from the mobile device. The system, then, determines a travel time based on the distance and the health profile. Next, the system executes an elevator call for the elevator with respect to the travel time.

18 Claims, 4 Drawing Sheets

(56) References Cited

U.S. PATENT DOCUMENTS

| | | | |
|---|---|---|---|
| 10,003,590 B2* | 6/2018 | Clark | H04L 67/10 |
| 10,035,684 B2* | 7/2018 | Roberts | B66B 9/003 |
| 2010/0213012 A1* | 8/2010 | Wang | B66B 5/0031 |
| | | | 187/247 |
| 2016/0167921 A1* | 6/2016 | Kattainen | B66B 1/24 |
| | | | 187/289 |
| 2016/0207735 A1* | 7/2016 | Elomaa | B66B 1/2458 |
| 2018/0162688 A1* | 6/2018 | Troesch | B66B 1/468 |
| 2019/0241398 A1* | 8/2019 | Marvin | B66B 5/0012 |

FOREIGN PATENT DOCUMENTS

| | | | | |
|---|---|---|---|---|
| CN | 102026900 A | 4/2011 | | |
| CN | 103237748 A | 8/2013 | | |
| CN | 103261069 A | 8/2013 | | |
| CN | 104192653 B | 3/2016 | | |
| CN | 105960372 A | 9/2016 | | |
| CN | 106115391 A | 11/2016 | | |
| CN | 106241524 A | 12/2016 | | |
| CN | 106315316 A | 1/2017 | | |
| CN | 106335822 A | 1/2017 | | |
| CN | 106395520 A | 2/2017 | | |
| CN | 106414291 A | 2/2017 | | |
| CN | 107000971 A | 8/2017 | | |
| CN | 107304017 A | 10/2017 | | |
| CN | 107304017 A | * 10/2017 | | B66B 1/14 |
| CN | 108002153 A | 5/2018 | | |
| EP | 3116200 A2 | * 1/2017 | | B66B 1/2408 |
| JP | 2015105189 A | 6/2015 | | |
| JP | 6058742 B2 | 1/2017 | | |
| WO | 2008116963 A1 | 10/2008 | | |
| WO | WO-2012101770 A1 | * 8/2012 | | B66B 1/2458 |
| WO | WO-2015119620 A1 | * 8/2015 | | B66B 1/3461 |
| WO | 2017175021 A1 | 10/2017 | | |
| WO | 2018075463 A1 | 4/2018 | | |

OTHER PUBLICATIONS

European Search Report for application EP 19191352.4, dated Jan. 8, 2020, 68 pages.

* cited by examiner

ELEVATOR CALLS FROM A WEARABLE BASED ON HEALTH PROFILE

FOREIGN PRIORITY

This application claims priority to Indian Patent Application No. 201811030188, filed Aug. 10, 2018, and all the benefits accruing therefrom under 35 U.S.C. § 119, the contents of which in its entirety are herein incorporated by reference.

BACKGROUND

Conventional elevator calling is performed via hall calls and car calls. At present, there is no mechanism for personalized elevator calls that leverage health information of a passenger.

BRIEF DESCRIPTION

In accordance with one or more embodiments, a method of health profile based elevator calls is provided. The method is implemented by a system including at least one elevator. The system is in communication with a mobile device of a user. The method includes determining, by the system, a distance between a lobby respective to the at least one elevator and the mobile device; acquiring, by the system, a health profile of the user from the mobile device; determining, by the system, a travel time based on the distance and the health profile; and executing, by the system, an elevator call for the at least one elevator with respect to the travel time.

In accordance with one or more embodiments or the method embodiment above, the system can automatically detect the mobile device via one or more location technologies including a geo-fence of the system.

In accordance with one or more embodiments or any of the method embodiments above, the system can directly receive an elevator call from the mobile device via one or more communication networks including a building local area network and a cellular network.

In accordance with one or more embodiments or any of the method embodiments above, the system can provide an elevator assignment and an arrival time to the mobile device for display to the user.

In accordance with one or more embodiments or any of the method embodiments above, the system can continually monitor a travel progress of the mobile device after executing the elevator call.

In accordance with one or more embodiments or any of the method embodiments above, the system can modify the elevator call with respect to the travel progress of the mobile device.

In accordance with one or more embodiments or any of the method embodiments above, the system can execute the elevator call after a call delay equal to the travel time minus a total between an elevator assignment time and an elevator travel time.

In accordance with one or more embodiments or any of the method embodiments above, the health profile can include average user travel speed.

In accordance with one or more embodiments or any of the method embodiments above, the system can modify the elevator call with respect to user feedback received from the mobile device.

In accordance with one or more embodiments or any of the method embodiments above, the mobile device can be a smart watch.

In accordance with one or more embodiments, a system for implementing health profile based elevator calls is provided. The system includes at least one elevator. The system is in communication with a mobile device of a user. The system is configured to determine a distance between a lobby respective to the at least one elevator and the mobile device; acquire a health profile of the user from the mobile device; determine a travel time based on the distance and the health profile; and execute an elevator call for the at least one elevator with respect to the travel time.

In accordance with one or more embodiments or the system embodiment above, the system can automatically detect the mobile device via one or more location technologies including a geo-fence of the system.

In accordance with one or more embodiments or any of the system embodiments above, the system can directly receive an elevator call from the mobile device via one or more communication networks including a building local area network and a cellular network.

In accordance with one or more embodiments or any of the system embodiments above, the system can provide an elevator assignment and an arrival time to the mobile device for display to the user.

In accordance with one or more embodiments or any of the system embodiments above, the system can continually monitor a travel progress of the mobile device after executing the elevator call.

In accordance with one or more embodiments or any of the system embodiments above, the system can modify the elevator call with respect to the travel progress of the mobile device.

In accordance with one or more embodiments or any of the system embodiments above, the system can execute the elevator call after a call delay equal to the travel time minus a total between an elevator assignment time and an elevator travel time.

In accordance with one or more embodiments or any of the system embodiments above, the health profile can include average user travel speed.

In accordance with one or more embodiments or any of the system embodiments above, the system can modify the elevator call with respect to user feedback received from the mobile device.

In accordance with one or more embodiments or any of the system embodiments above, the mobile device can be a smart watch.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
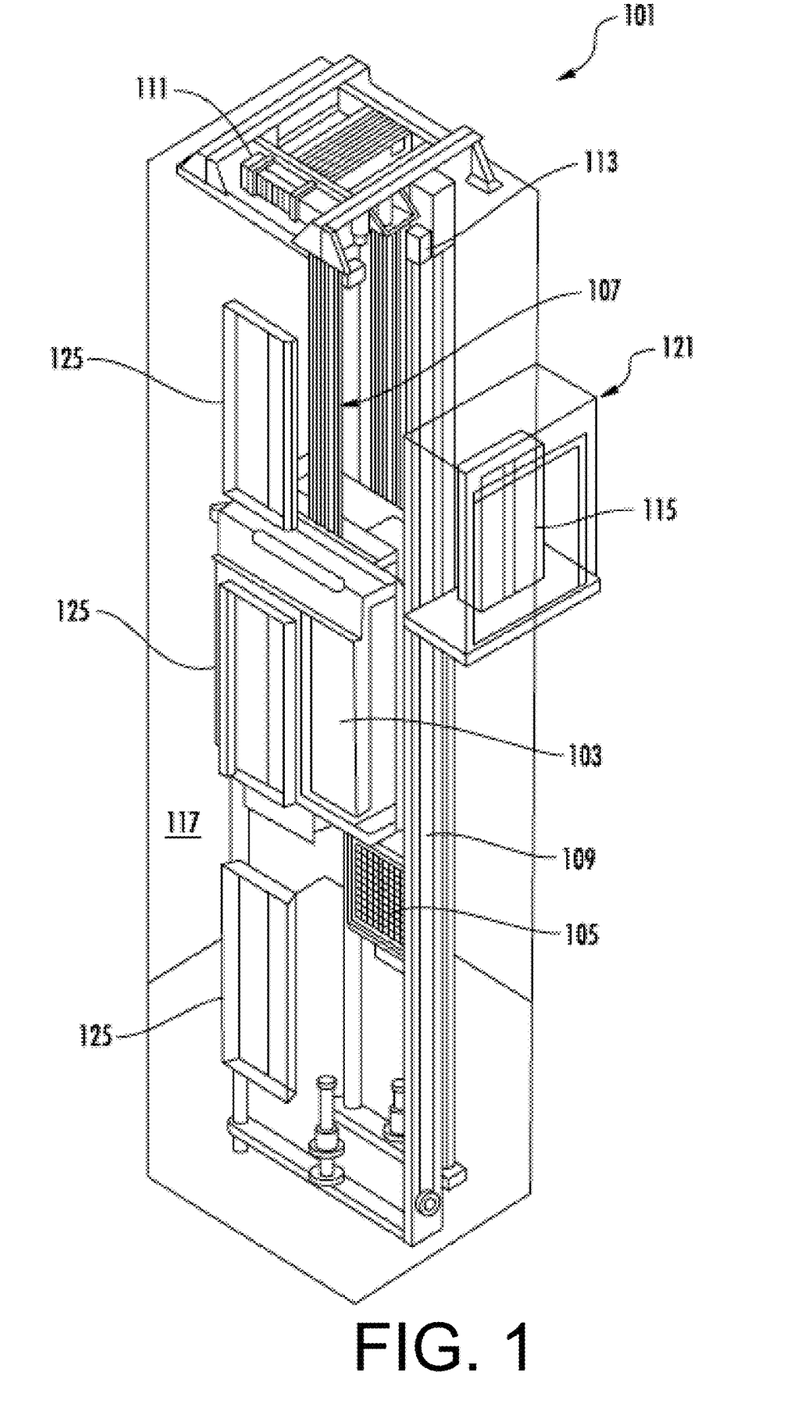
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
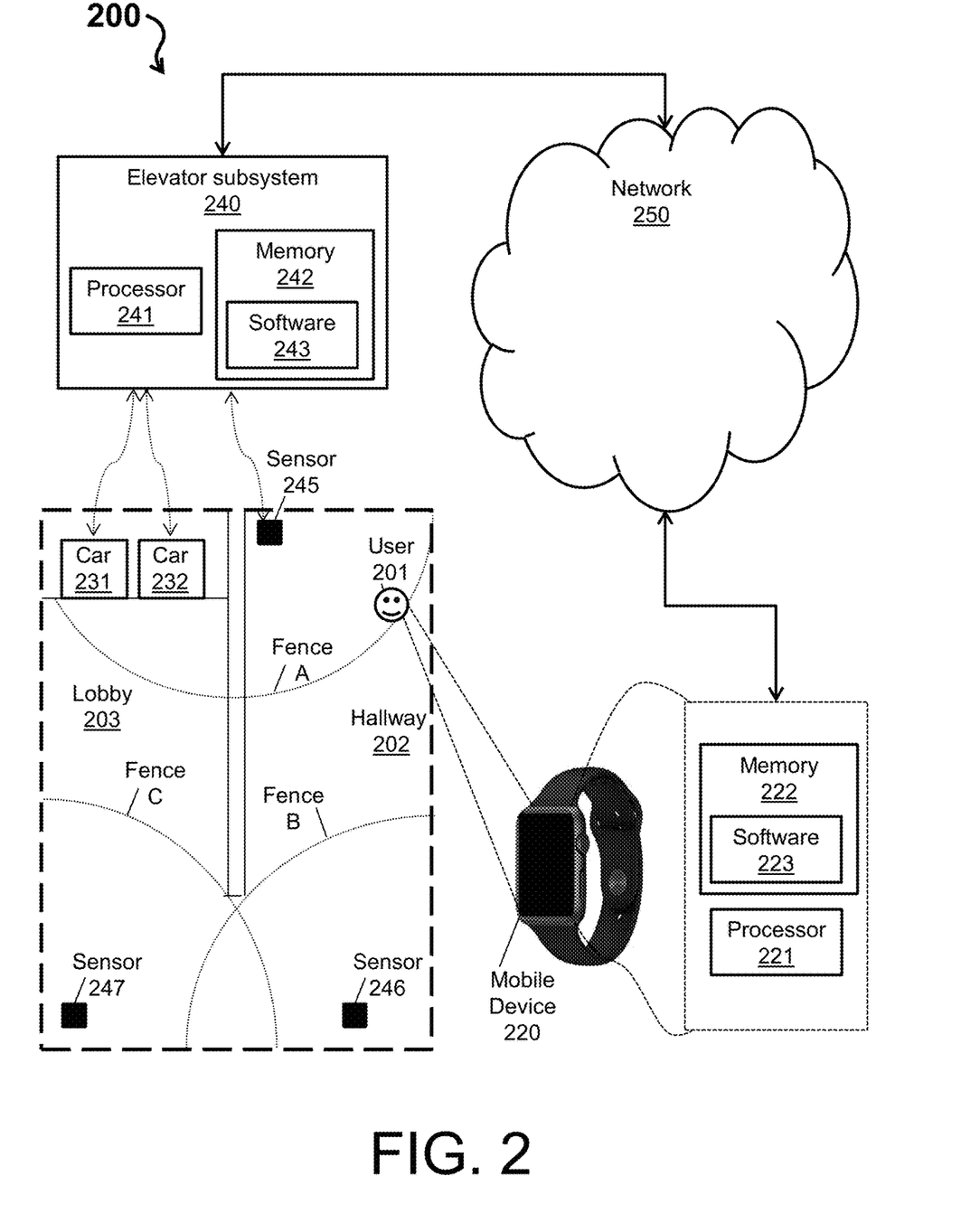
FIG. 2 depicts a system for implementing health profile based elevator calls in accordance with one or more embodiments.

FIG. 2 depicts a schematic illustration of a system 200 for implementing health profile based elevator calls in accordance with one or more embodiments, which can be realized as processor-implemented methods and/or computer program products. The system 200 is overlaid a building through which a user 201 can traverse. As shown in FIG. 2, the user 201 is in a hallway 202 of the building walking towards the lobby 203. The user 201 has a mobile device 220 that is connected to and/or a part of the system 200. The mobile device 220 includes a processor 221 and a memory 222 with software 223 (e.g., mobile application) stored thereon. The user 201, further, is walking towards the lobby 203 for transportation by an elevator car 231 or an elevator car 232 of the system 200. The elevator cars 231, 232 are controlled by an elevator subsystem 240 of the system 200. The elevator subsystem 240 includes a processor 241 and a memory 242 with software 243 stored thereon (e.g., dispatching software) and communicates with one or more sensors 245, 246, 247, each of which respectively generate a fence A, B, C. The elevator subsystem 240 communicates via a network 250 of the system 200 with the mobile device 220. That is, the system 200 supports and communicates signals between the mobile device 220, the elevator subsystem 240, the network 250, and elements therein to support detecting, assigning, elevator calling, and notifying operations described herein.

The system 200 implements health profile based elevator calls. The system 200 and elements therein may take many different forms and include multiple and/or alternate components and facilities. The system 200 is only one example and is not intended to suggest any limitation as to the scope of use or operability of embodiments described herein (indeed additional or alternative components and/or implementations may be used). While single items are illustrated for the system 200 (and other items), these representations are not intended to be limiting and thus, any items may represent a plurality of items.

In general, the system 200 enhances an experience of the user 201 through implementing and managing health profile based elevator calls by automatically timing an arrival of one of the elevator cars 231, 232 with respect to an expected user arrival at the lobby 203 in the backend (e.g., by the elevator subsystem 240) and updating elevator assignment notifications on the mobile device 220. In this regard, the elevator subsystem 240 utilizes a travel time based on a health profile of the user 201, a location of the mobile device 220 based on the one or more fences A, B, C, and a total between an elevator assignment time and an elevator travel time to determine an optimum time to call one of the elevator cars 231, 232. The technical effects and benefits of the system 200 include reducing a waiting time for the user 201 once at the lobby 203, improving user experience in calling one of the elevator cars 231, 232 from the mobile device 220, executing seamless elevator calls from the mobile device 220 based on the automatic detection by the fences A, B, C, and including a capability of integrating with evolving wearable technologies.

In accordance with one or more embodiments of the disclosure herein, the elevator subsystem 240 is an example of the elevator system 101 of FIG. 1. In this regard, for example, the elevator subsystem 240 includes electromechanical arrangements (e.g., a controller and/or computing device that communicates with at least one motor) that control speed, position, and door operation of an elevator (e.g., of a bank of elevators 231, 232).

The elevator subsystem 240 is in the form of a general-purpose computing device that is improved upon by the operation and functionality of the embodiments described herein. As shown in FIG. 2, the components of the elevator subsystem 240 includes, but are not limited to, the processor 241 and the memory 242 with software 243 stored thereon.

The mobile device 220 can be any computing device for operating the software 223 and interacting with the system 200. The mobile device 220 can include a global positioning system or other location technology. The mobile device 220 is only one example of a suitable computing node and is not intended to suggest any limitation as to the scope of use or operability of embodiments described herein (indeed additional or alternative components and/or implementations may be used. That is, the mobile device 220 and elements therein may take many different forms and include multiple and/or alternate components and facilities. For instance, the mobile device 220 can be any and/or employ any number and combination of computing devices and networks utilizing various communication technologies, as described herein. Examples of the mobile device 220 include a smart watch, a wearable computing device, a mobile phone, a smart phone, a tablet computer, a laptop, etc. As shown in FIG. 2, the components of the mobile device 220 includes, but are not limited to, the processor 221 and the memory 222.

The processors 221, 241 include any processing hardware, software, or combination of hardware and software (utilized by the mobile device 220 and the elevator subsystem 240, respectively) that carries out the computer readable program instructions by performing arithmetical, logical, and/or input/output operations. Examples of the processors 221, 241 include, but are not limited to an arithmetic logic unit, which performs arithmetic and logical operations; a control unit, which extracts, decodes, and executes instructions from a memory; and an array unit, which utilizes multiple parallel computing elements.

The memories 222, 242 are examples of a tangible device that retains and stores computer readable program instructions or at least one program product (e.g., the software 223, 243, respectively) for use by the processors 221, 241 to carry out the operations of embodiments herein. The memories 222, 242 can include a variety of computer system readable media. Such media may be any available media that is accessible and it includes both volatile and non-volatile media, removable and non-removable media.

Each of the software 223 and the software 243 is a set of computer readable instructions stored in the memories 222, 242, respectively, along with an operating system, one or more application programs, other program modules, and program data. In this regard, the processors 221, 241 execute the software 223 and the software 243 on the memories 222, 242, thereby performing one or more processes defined herein. The software 223, more particularly, causes the mobile device 220 to generate elevator calls, support one or more user interfaces, communicate location information and health profiles to the elevator subsystem 240, generate health profile information 240, and provide notifications to the user 201, such as is described herein with reference to FIGS. 3-4. The health profile can be stored on the memory 222 of the mobile device 220 and include pedometer data generated by the mobile device 220. The pedometer data can further include an average user travel speed. The software 243, more particularly, causes the elevator subsystem 240 to determine a distance between the lobby 203 and the mobile device 220, acquire the health profile of the user 201 from the mobile device 202, determine a travel time based on the distance and the health profile; and execute an elevator call for the at least one elevator with respect to the travel time, such as is described herein with reference to FIGS. 3-4. Examples of notifications may include, but are not limited to, application prompts, text messaging, audio alerts, electronic mail, interface alerts, instant messaging, and the like.

The one or more sensors 245, 246, 257 can be any device that generate fences A, B, C to detect a location of the mobile device. In accordance with one or more embodiments, the one or more sensors 245, 246, 257 utilize software to trigger a response within the system as the mobile device 220 enters, leaves, and/or moves through a particular area, as defined by the fences A, B, C. The fences A, B, C (also referred to as geo-fences A, B, C) are virtual geographic boundaries defined by radio wave and/or global positioning technologies.

The network 250 can be a distributed cloud computing environment (e.g., a cloud distribution system) where tasks are performed by remote processing devices that are linked through a communications within the network 250. The network 250 can comprise hardware and/or software that are similar to the computing device 220 described herein. In the network 250, program modules may be located in both local and remote computer system storage media including memory storage devices. Operations of the system 200 will now be described with respect to FIGS. 3-4.

Figure 3:
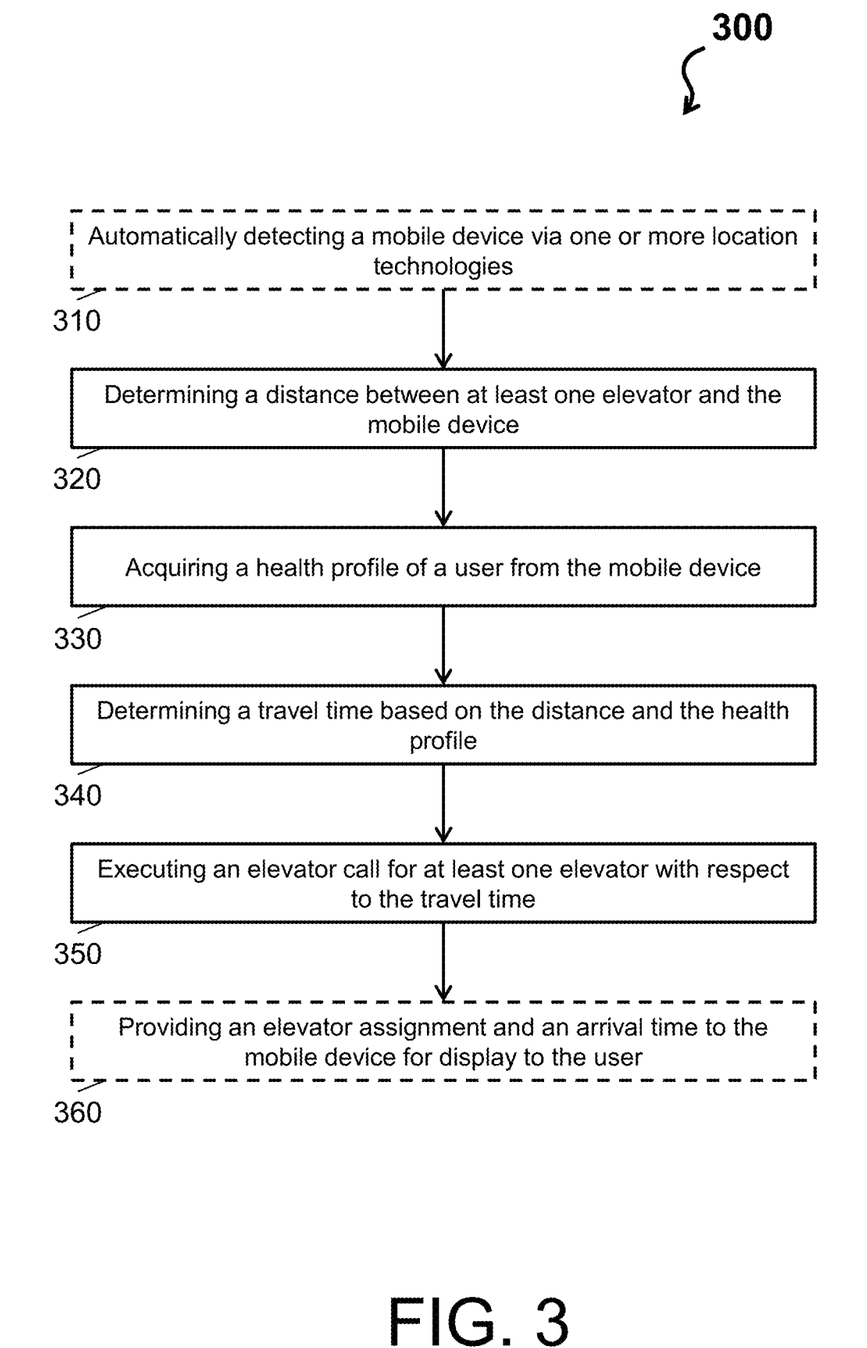
FIG. 3 depicts a process flow of a system for implementing health profile based elevator calls in accordance with one or more embodiments.

FIG. 3 depicts a process flow 300 of the system 200 for implementing health profile based elevator calls in accordance with one or more embodiments. More particularly, the process flow 300 is a method of health profile based elevator calls implemented by the system 200.

The process flow 300 begins at dashed block 310, where the system 200 automatically detects the mobile device 220 via one or more location technologies, such as the geo-fence A of the sensor 245. Note that dashed block 310 is optional. In this regard, with respect to one or more embodiments, the process 300 begins by directly receiving an elevator call from the mobile device 220 via the network 250 (e.g., one or more communication networks comprising a building local area network and a cellular network). In one or more embodiments, the process 300 begins by receiving an elevator call from the mobile device 220 and/or detecting the mobile device 220 via the one or more location technologies.

At block 320, the system 200 determines a distance between the lobby 203 respective to the elevator cars 231, 232 and the mobile device 220. The distance can be measured with respect to where the mobile device 220 is detected within the geo-fence A and/or to a location determined by location technology of the mobile device 220, which is defined as a device location. The distance can be measured with respect to a hall door in the lobby 203, a central location of the lobby 203 itself, a hall elevator panel in the lobby 203, etc., which is defined as a destination location. In this regard, for example, the system 200 calculates the distance between the device location and the destination location.

At block 330, the system 200 acquires a health profile of the user 201 from the mobile device 202. The health profile include pedometer data generated by the mobile device 220, which may be further based on activity data of the user 201. The activity data can be sourced from other devices than the mobile device 220 and include information such as number of steps, length of activity time, activity type, heart rate, calories burnt, etc. The activity data can also include information with respect to pedometer data that is utilized determine an average user travel speed (e.g., walking speed, bike speed, job, speed, scooter sped, etc.) of the user 201. The average user travel speed can be determined based on distance over time (e.g., meters per second)

At block 340, the system 200 determines a travel time based on the distance and the health profile. The travel time is a value for how long the user will take to traverse the distance based on their health profile. For instance, if the device location of the mobile device is determined to be 100 meters to the lobby 203 from block 320 and if the average user travel speed is determined to be 1.5 meters per second from the health information of block 330, then the travel time can be determined to be 66.6 seconds (or the distance divided by the average user travel speed).

At block 350, the system 200 executes an elevator call for one of the elevator cars 231, 232 with respect to the travel time. The system 200 can execute the elevator call after a call delay. The call delay can be equal to the travel time minus a total between an elevator assignment time and an elevator travel time. For instance, if the elevator assignment time is 10 seconds and the elevator travel time is 30 seconds, then 66.6 seconds minus 40 seconds equals a 26 second call delay.

At dashed block 360, the system 200 provides an elevator assignment and an arrival time to the mobile device 220 for display to the user 201. Note that dashed block 360 is optional. In this regards, the system 200 can communicate with the mobile device 220 the elevator assignment and/or the arrival time so that the user know which elevator door to stand in front of and when.

Figure 4:
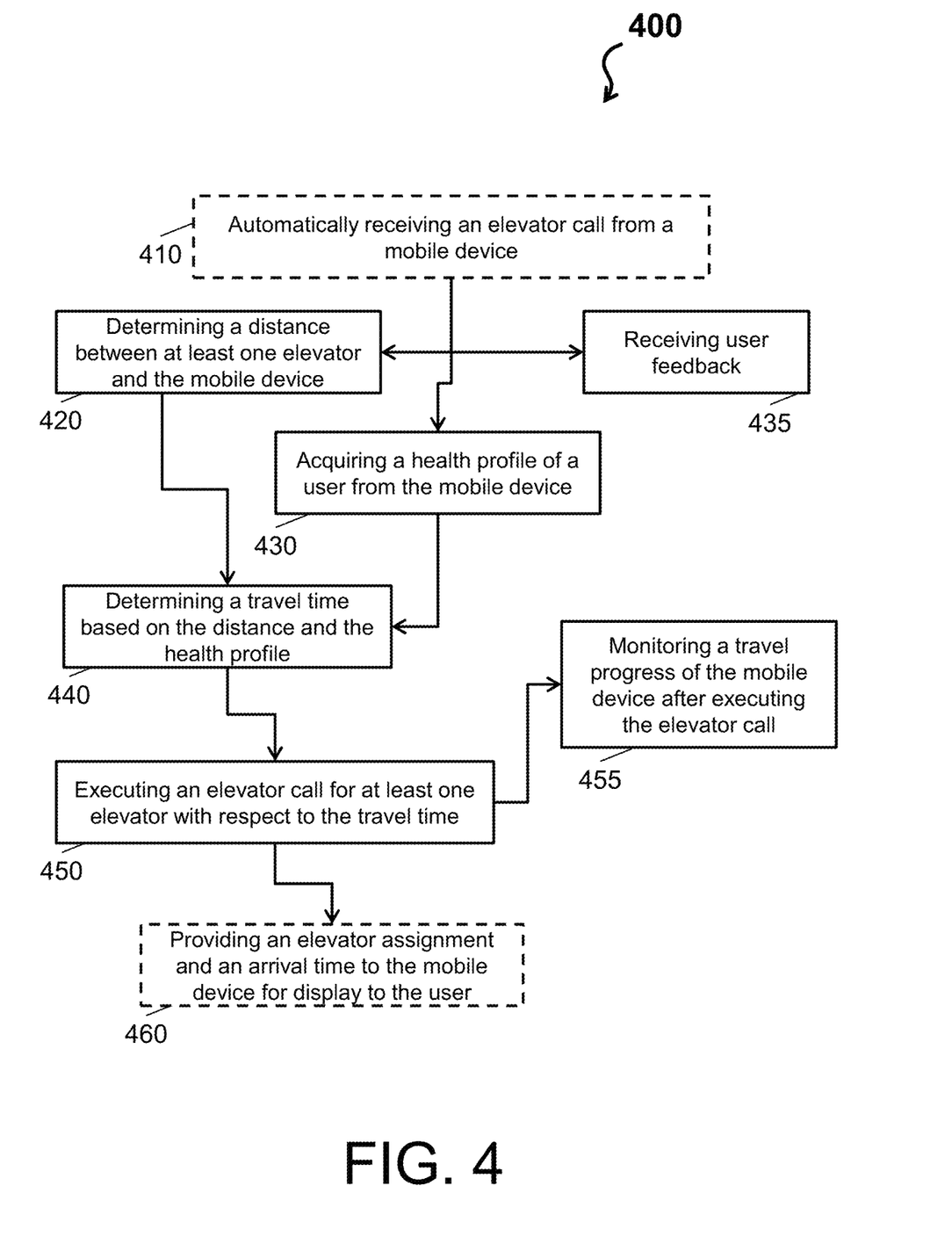
FIG. 4 depicts a process flow of a system for implementing health profile based elevator calls in accordance with one or more embodiments.

FIG. 4 depicts a process flow 400 of the system 200 for implementing health profile based elevator calls in accordance with one or more embodiments. More particularly, the process flow 400 is a method of health profile based elevator calls implemented by the system 200.

The process flow 400 begins at dashed block 410, where the system 200 directly receives an elevator call from the mobile device 220 via the network 250 (e.g., one or more communication networks comprising a building local area network and a cellular network). The mobile device 220 can send location information (e.g., device location) along with the elevator call. The elevator call can further indicate which destination the user 201 want to travel (e.g., which floor). Note that dashed block 410 is optional. In this regard, with respect to one or more embodiments, the process 300 begins by receiving an elevator call from the mobile device 220 and/or detecting the mobile device 220 via the one or more location technologies.

At block 420, the system 200 determines a distance between the lobby 203 respective to the elevator cars 231, 232 and the mobile device 220. At block 430, the system 200 acquires a health profile of the user 201 from the mobile device 202. At block 435, the system 200 receives user feedback. User feedback can be entered through a user interface generated by the software 223 and the mobile device 220. The user feedback can include estimate time of arrival at a building where the elevators are located, so that the elevator subsystem 240 can expect a detection of the mobile device 220 in the future. The elevator subsystem 240 can modify the elevator call with respect to user feedback received from the mobile device 220.

At block 440, the system 200 determines a travel time based on the distance and the health profile. At block 450, the system 200 executes an elevator call for one of the elevator cars 231, 232 with respect to the travel time.

At block 455, the system 200 continually monitors a travel progress of the mobile device 220 after executing the elevator call. In turn, the system 200 can modify the elevator call and dispatching of the elevators 231, 232 with respect to the travel progress of the mobile device 220. Travel progress can indicate movement of the mobile device, such as moving toward, away, or tangential to the lobby 203 and a change in speed of that movement.

At dashed block 460, the system 200 provides an elevator assignment and an arrival time to the mobile device 220 for display to the user 201. Note that dashed block 360 is optional.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of health profile based elevator calls implemented by a system comprising at least one elevator, the system being in communication with a mobile device of a user, the method comprising:

determining, by the system, a distance between a lobby respective to the at least one elevator and the mobile device;

acquiring, by the system, a health profile of the user from the mobile device;

determining, by the system, a travel time based on the distance and the health profile; and executing, by the system, an elevator call for the at least one elevator with respect to the travel time;

wherein the system executes the elevator call after a call delay equal to the travel time minus a total between an elevator assignment time and an elevator travel time.

2. The method of claim 1, wherein the system automatically detects the mobile device via one or more location technologies comprising a geo-fence of the system.

3. The method of claim 1, wherein the system directly receives an elevator call from the mobile device via one or more communication networks comprising a building local area network and a cellular network.

4. The method of claim 1, wherein the system provides an elevator assignment and an arrival time to the mobile device for display to the user.

5. The method of claim 1, wherein the system continually monitors a travel progress of the mobile device after executing the elevator call.

6. The method of claim 5, wherein the system modifies the elevator call with respect to the travel progress of the mobile device.

7. The method of claim 1, wherein the health profile comprises average user travel speed.

8. The method of claim 1, wherein the system modifies the elevator call with respect to user feedback received from the mobile device.

9. The method of claim 1, wherein the mobile device comprises a smart watch.

10. A system for implementing health profile based elevator calls, the system comprising at least one elevator, the system being in communication with a mobile device of a user, the system being configured to:

determine a distance between a lobby respective to the at least one elevator and the mobile device;

acquire a health profile of the user from the mobile device;

determine a travel time based on the distance and the health profile; and execute an elevator call for the at least one elevator with respect to the travel time;

wherein the system executes the elevator call after a call delay equal to the travel time minus a total between an elevator assignment time and an elevator travel time.

11. The system of claim 10, wherein the system automatically detects the mobile device via one or more location technologies comprising a geo-fence of the system.

12. The system of claim 10, wherein the system directly receives an elevator call from the mobile device via one or more communication networks comprising a building local area network and a cellular network.

13. The system of claim 10, wherein the system provides an elevator assignment and an arrival time to the mobile device for display to the user.

14. The system of claim 10, wherein the system continually monitors a travel progress of the mobile device after executing the elevator call.

15. The system of claim 11, wherein the system modifies the elevator call with respect to the travel progress of the mobile device.

16. The system of claim 10, wherein the health profile comprises average user travel speed.

17. The system of claim 10, wherein the system modifies the elevator call with respect to user feedback received from the mobile device.

18. The system of claim 10, wherein the mobile device comprises a smart watch.

* * * * *